US012610972B2

(12) United States Patent　　　　(10) Patent No.:　US 12,610,972 B2
Delcour et al.　　　　　　　　　　　　(45) Date of Patent:　　Apr. 28, 2026

(54) CEREAL FLAKES

(71) Applicant: Katholieke Universiteit Leuven, Leuven (BE)

(72) Inventors: Jan Delcour, Heverlee (BE); Elien Lemmens, Binkom (BE); Niels De Brier, Heverlee (BE); Lomme Deleu, Kapelstraat (BE)

(73) Assignee: Katholieke Universiteit Leuven, Leuven (BE)

( * ) Notice: Subject to any disclaimer, the term of this patent is extended or adjusted under 35 U.S.C. 154(b) by 623 days.

(21) Appl. No.: 17/624,423

(22) PCT Filed: Jul. 1, 2020

(86) PCT No.: PCT/EP2020/068460
§ 371 (c)(1),
(2) Date: Jan. 3, 2022

(87) PCT Pub. No.: WO2021/001401
PCT Pub. Date: Jan. 7, 2021

(65) Prior Publication Data
US 2022/0361537 A1　　Nov. 17, 2022

(30) Foreign Application Priority Data

Jul. 1, 2019　(EP) ..................................... 19183562
Jul. 4, 2019　(EP) ..................................... 19184286

(51) Int. Cl.
A23L 7/25　　　　(2016.01)
A23L 7/139　　　(2016.01)
A23L 7/152　　　(2016.01)

(52) U.S. Cl.
CPC ................. *A23L 7/25* (2016.08); *A23L 7/139* (2016.08); *A23L 7/152* (2016.08); *A23V 2002/00* (2013.01)

(58) Field of Classification Search
CPC ............. A23L 7/25; A23L 7/139; A23L 7/152
See application file for complete search history.

(56) References Cited

U.S. PATENT DOCUMENTS 1,564,181 A * 12/1925 Kellogg .................. A23L 7/115
　　　　　　　　　　　　　　　　　　　　　　　426/466
5,298,274 A 　3/1994　Khalsa

FOREIGN PATENT DOCUMENTS

KR　　　101520019 B1　　5/2015

OTHER PUBLICATIONS

Kao, Tsai-Hua. "Health Potential for Beer Brewing ByProducts" Current Topics on Superfoods. May 30, 2018 (Year: 2018).*

(Continued)

*Primary Examiner* — Katherine D Leblanc
(74) *Attorney, Agent, or Firm* — DINSMORE & SHOHL LLP

(57) ABSTRACT
The invention relates to methods comprising the steps of producing a whole grain cereal flake product containing on a dry matter basis at least 4.0% (w/w) maltose and 1.0% (w/w) maltotriose comprising the steps of: a) providing a sprouted or malted (pseudo-)cereal of a non-peeled cereal, b) optionally adding sugar, c) incubating the composition of step a) or b) in moist conditions at a temperature for a time period allowing the enzymatic release of maltose and maltotriose from starch, d) further heating the incubated composition, e) flaking the heated composition, and f) drying the flaked composition.

12 Claims, 8 Drawing Sheets

(56) References Cited

OTHER PUBLICATIONS

Figure 1:
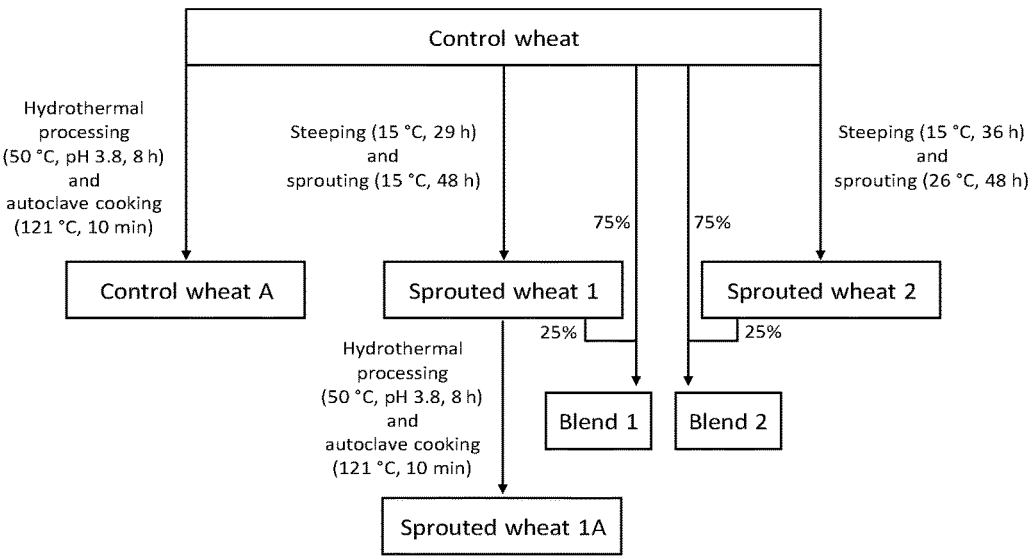

Sprouted Whole Grains https://web.archive.org/web/20180409022158/
https://wholegrainscouncil.org/whole-grains-101/whats-whole-grain-
refined-grain/sprouted-whole-grains Apr. 9, 2018 (Year: 2018).*
Robert B. Fast et al., Breakfast Cereals And How They Are Made,
Ready-to-Eat Cereals, American Association of Cereal Chemists,
1990, pp. 14-41, St. Paul, MN, USA.
Jan A. Delcour et al., Principles of Cereal Science and Technology,
2010, pp. 241-247, 3rd ed. AACC International, St. Paul, MN, USA.
Ludmilla C. Oliveira et al., Effect of the addition of whole-grain
wheat flour and of extrusion process parameters on dietary fibre
content, starch transformation and mechanical properties of a ready-
to-eat breakfast cereal, International Journal of Food Science and
Technology 50, 2015, pp. 1504-1514.
Ludmilla C. Oliveira et al., Development of whole grain wheat flour
extruded cereal and process impa.cts on color, expansion, and dry
and bowl-life texture, LWT—Food Science and Technology 75,
2017, pp. 261-270.
Julie Woods et al., Choosing breakfast: How well does packet
information on Australian breakfast cereals, bars and drinks reflect
recommendations?, Nutrition & Dietetics, 2007, 64, pp. 226-233.
Roderick Agbisit et al., Relationships Between Microstructure and
Mechanical Properties of Cellular Cornstarch Extrudates, Journal of
Texture Studies, 2007, 38, pp. 199-219.
James W. Anderson et al., Health benefits and practical aspects of
high-fiber diets1'2, Am J Clin Nutr, 1994, 59 (suppl), 1242S-7S.
R.E. Tribelhorn et al., Breakfast Cereals, Handbook of Cereal
Science and Technology, AP-42 Section No. 9.9.2, Reference No. 1,
1991, pp. 741-762.
Jan Willem Van Der Kamp et al., The Healthgrain definition of
'whole grain', Food & Nutrition Research, 2014 pp. 1-8, 58: 22100.
Lijia Zhu et al., Effect of Germination and Extrusion on Physicochemi-
cal Properties and Nutritional Qualities of Extrudates and Tortilla
from Wheat, Journal of Food Science, 2017, pp. 1867-1875, vol. 82,
Nr. 8.
Kritika Singh et al., a-Amylase from wheat (*Triticum aestivum*)
seeds: Its purification, biochemical attributes and active site studies,
Food Chemistry, 2014, pp. 1-9, 162.
Sasathorn Singkhornart et al., Physicochemical properties of extruded
germinated wheat and barley as modified by CO2 injection and
difference extrusion conditions, International Journal of Food Sci-
ence and Technology 2013, pp. 290-299, 48.
Joanne L. Slavin, Mechanisms for the Impact of Whole Grain Foods
on Cancer Risk, Journal of the American College of Nutrition, 2000,
pp. 300S-307S, vol. 19, No. 3, Published by the American College
of Nutrition.
Neil Roder et al., Factors affecting the action of a-amylase on wheat
starch: Effects of water availability. An enzymio and structural
study, Food Chemistry 113, 2009, pp. 471-478.
Giampiero Sacchetti et al., Kinetic modelling of textural changes in
ready-to-eat breakfast cereals during soaking in semi-skimmed
milk, International Journal of Food Science and Technology, 2003,
38, pp. 135-143.
Peter R. Shewry et al., The contribution of wheat to human diet and
health, Food and Energy Security, 2015, 4 (3), pp. 178-202.
J. Pagand et al., The Magic and Challenges of Sprouted Grains,
Cereal Foods World, 2017, pp. 221-226, vol. 62, No. 5.
S.A. Navale et al., Extrusion Cooking Technology for Foods: A
Review, Journal of Ready To Eat Food, 2015, pp. 66-80, vol. 2,
Issue 3, 2015 Jakraya Publications (P) Ltd.
Elien Lemmens et al., The impact of steeping, germination and
hydrothermal processing of wheat (*Triticum aestivum* L.) grains on
phytate hydrolysis and the distribution, speciation and bio-
accessibility of iron and zinc elements, Food Chemistry, 2018, pp.
367-376, 264.
Elien Lemmens et al., Impact of Cereal Seed Sprouting on Its
Nutritional and Technological Properties: A Critical Review, Com-
prehensive Reviews in Food Science and Food Safety, 2018, pp.
1-24, vol. 0.

Simin Liu et al., Whole-grain consumption and risk of coronary
heart disease: results from the Nurses' Health Study1-3, Am J Clin
Nutr, 1999, 70, pp. 412-419.
Ting Liu et al., Quality attributes of whole-wheat flour tortillas with
sprouted whole-wheat flour substitution, LWT—Food Science and
Technology, 2017, pp. 1-7, 77.
Marie Larson et al., Improved zinc and iron absorption from
breakfast meals containing malted oats with reduced phytate con-
tent, British Journal of Nutrition, 1996, pp. 677-688, 76.
Lavic, Relative Sweetness Values for Various Sweeteners,
XP055434432, 2011.
A.S. Le Corre, Ready-to-Eat Breakfast Cereal Manufacturing: Use
of Twin-Screw Extrusion Technology to Produce Multiple Products,
Cereal Foods World, AACC International, Inc., 2006, pp. 302-305.
Kruger & Reed, Enzymes and color, Wheat: Chemistry and Tech-
nology. American Association of Cereal Chemists, St. Paul, MN,
USA, 1988, p. 441-500.
Z. Kruma et al., Changes in the nutritional value of breakfast cereals
containing germinated spring grain flakes during storage, Agronomy
Research 16(S2), 2018, pp. 1405 1416.
Tatjana Kince et al., Breakfast cereals with germinated cereal flakes:
changes in selected physical, microbiological, and sensory charac-
teristics during storage, Eur Food Res Technol, 2017, pp. 1-10.
Hari B. Krishnan et al., Wheat Invertases1 Characterization of Cell
Wall-Bound and Soluble Forms, Plant Physiol. 78, 1985, pp.
241-245.
Qing-Bo Ding et al., The effect of extrusion conditions on the
functional and physical properties of wheat-based expanded snacks,
Journal of Food Engineering 73, 2006, pp. 142-148.
Iris J. Joye et al., In situ production of c-aminobutyric acid in
breakfast cereals, Food Chemistry 129, 2011, pp. 395-401.
M.A. Kashem et al., Starch, Sugar, Amylase and Invertase Activity
In The Germinating Seeds Of Modern Wheat Varieties, J. Ntl. Sci.
Found. Sri Lanka 23, 1995, pp. 55-61.
Jeroen S.L. De Munter et al., Whole Grain, Bran, and Germ Intake
and Risk of Type 2 Diabetes: A Prospective Cohort Study and
Systematic Review, PLoS Medicine | www.plosmedicine.org, 2007,
pp. 1385-1395, vol. 4, Issue 8, e261.
Evelien De Backer et al., Post-translational processing of b-D-
xylanases and changes in extractability of arabinoxylans during
wheat germination, Plant Physiology and Biochemistry 48, 2010,
pp. 90-97.
N. De Brier et al., Structure, chemical composition and enzymatic
activities of pearlings and bran obtained from bearled wheat (*Triticum
aestivum* L.) by roller milling, Journal of Cereal Science 62, 2015,
pp. 66-72.
N. De Brier et al., The impact of pearling as a treatment prior to
wheat roller milling on the texture and structure of pran-rich
breakfast flakes, LWT—Food Science and Technology 62, 2015, pp.
668-674.
K. Autio et al., Structural and Enzymic Changes in Germinated
Barley and Rye, Structural and Enzymk Changes in Germinated
Barky and Rye, 2001, pp. 19-25, vol. 107, No. 1.
Paolo Benincasa et al., Sprouted Grains: A Comprehensive Review,
Nutrients 2019, 11, 421, 2019, pp. 1-29.
Naohiro Aoki et al., Pathway of Sugar Transport in Germinating
Wheat Seeds, Plant Physiology, Aug. 2006, pp. 1255-1263, vol.
141.
International Search Report issued in Corresponding International
Application No. PCT/EP2020/068460 on Oct. 7, 2020.
Pagand, et al., "The Magic and Challenges of Sprouted Grains",
Cereal Foods World, pp. 1-7, 2021.
Kince, et al., "Breakfast cereals with germinated cereal flakes:
changes in selected physical, microbiological, and sensory charac-
teristics during storage", Eur. Food Res. Technol., vol. 243, pp.
1497-1506, 2017.
Senhofa, et al. "Effects of Germination on Chemical Composition of
Hull-Less Spring Cereals", Food Sciences, vol. 1, pp. 91-97, 2016.

* cited by examiner

CEREAL FLAKES

CROSS REFERENCES TO RELATED APPLICATIONS

This application is a national-stage application under 35 U.S.C. § 371 of International Application No. PCT/EP2020/068460, filed Jul. 1, 2020, which International Application claims benefit of priority to European Patent Application No. 19183562.8, filed Jul. 1, 2019, and to European Patent Application No. 19184286.3, filed Jul. 4, 2019.

FIELD OF THE INVENTION

The invention relates to the production of cereal flakes.

The invention relates to the use of malted cereal, typically whole grain malted cereal, in the production of cereal flakes.

BACKGROUND OF THE INVENTION

Breakfast cereals are made through a variety of technologies described in Fast & Caldwell (1990) American Association of Cereal Chemists, St. Paul, MN, USA, 372 p and Delcour & Hoseney (2010) Principles of Cereal Science and Technology, 3rd ed. AACC International, St. Paul, MN, USA, 270 p. Wheat (flour) is a common raw material for the production of cereal flakes [Oliveira et al. (2015) *Int. J. Food Sci. Technol.* 50, 1504-1514].

A concern is that commercial cereal flakes often have high contents of added sugar [Woods & Walker (2007) *Nutrition & Dietetics* 64, 226-233] and, as a result, on a serving portion weight basis, contain less desirable minerals and vitamins than if less or no sugar would be added.

In addition, the consumer desires whole meal products high in dietary fibre and nutrients such as minerals and vitamins which benefit health. However, peeling or pearling of wheat grains, a process in which the outer layer of the kernels are (partly) removed prior to cooking as part of a cereal flaking process makes that they cannot be sold as whole grain products. Unfortunately, the presence of the outer layers would be problematic as it would result in an unpleasant straw-like mouthfeel of the processed cereal.

SUMMARY OF THE INVENTION

The invention relates to the production of flakes with high levels of sweet intrinsic saccharides either by using whole wheat grains or hydrothermally processed such grains or milled fractions thereof alone or as part of the ingredient bill. The methods of the invention allow to produce cereal flakes with an improved nutritive value, a unique flavour profile and a cleaner label, since less or no sugar addition is needed.

The methods of the present invention provide whole grain cereals with a pleasant mouthfeel by using a non-peeled whole grain wheat malt.

The use of sprouted grains allows proper processing into a well-structured cereal flake which is a whole grain product, without a straw-like mouthfeel. The presence of sugars generated by the enzymes of the sprouted grain in combination with compounds generated during kilning give a sweet impression, even without added sugar.

The use of sprouted grain results in a palatable whole grain cereal product containing no added sugar. This is important as health benefits are ascribed to whole grain products.

Embodiments of the present invention use a moistened sprouted cereal as starting product. This avoids an unnecessary step of moistening a dried malted cereal. Apart from saving energy for drying the sprouted cereal and saving water for moistening afterwards, the absence of the drying step reduces the formation of acrylamide.

The methods of the present invention allow to produce a flake product with an EBC<10. (European Brewery convention colour unit).

The invention is summarised in the following statements:

1. A method of producing a cereal flake product containing on a dry matter basis at least 0.9% (w/w), at least 1.5% (w/w), at least 2% (w/w), at least 3% (w/w) or at least 4% (w/w) maltose and at least 0.3% (w/w), at least 0.4% (w/w), at least 0.5% (w/w), at least 0.7% (w/w), at least 0.9% (w/w) or at least 1.0% (w/w) maltotriose comprising the steps of:
   a) providing a malted or sprouted (pseudo-)cereal or a mixture of a malted or sprouted (pseudo-) cereal and a (pseudo-)cereal, typically a moistened (15-25 g water per 100 g composition) non-peeled, sprouted (pseudo-) cereal,
   b) optionally adding sugar (sugar can also be added before or after step b),
   c) incubating the composition of step a) or b) in moist conditions at a temperature for a time period allowing the enzymatic release of maltose and maltotriose from starch and optionally allowing a simultaneous or subsequent reduction in moisture content, typically to a moisture content of less than 25% (w/w), less than 20% (w/w), less than 15% (w/w), down to 10% (w/w) or down to 8% (w/w).
   d) further heating the incubated composition,
   e) flaking the heated composition, and
   f) drying the flaked composition.

In the present method step d) inactivates enzymes, kills microorganisms, and softens the cereals.

2. The method according to statement 1, wherein the (pseudo-)cereal or the malted or sprouted (pseudo-cereal) in step a) are grains or peeled grains, kernels or peeled kernels.

3. The method according to statement 1, wherein the (pseudo-)cereal and the malted or sprouted (pseudo-)cereal grains in step a) are milled grain fragments or milled kernels such as whole meal, flour or grits.

4. The method according to any one of statements 1 to 3, wherein the composition in step a) has an alpha-amylase activity exceeding 100 U, 125 U, 150 U or 200 U/g dry matter/hour.

5. The method according to any one of statements 1 to 4, wherein the composition in step a) has an alpha-amylase activity exceeding 400 U, 500 U/g dry matter/hour.

6. The method according to one of statements 1 to 5, providing in step a) a malted or sprouted cereal or a mixture of a malted or sprouted cereal and a cereal in moist conditions.

7. The method according to any one of statements 1 to 6, wherein the sprouted or malted cereal and/or the cereal are barley and/or wheat, preferably the malted or spouted cereal is wheat.

8. The method according to any one of statements 1 to 7, wherein the malted or sprouted cereal is wheat and the cereal is wheat.

9. The method according to any one of statements 1 to 8, providing in step a) a non-dried malted (i.e. sprouted) (pseudo-) cereal.

10. The method according to any one of statements 1 to 8, providing in step a) a malted (pseudo-)cereal.

11. The method according to any one of statements 1 to 10, wherein in step b) sugar is added in an amount of up to 15, up to 10 or up to 6 g/100 g dry matter.

12. The method according to statement 11, wherein the sugar is sucrose.

13. The method according to any one of statements 1 to 12, wherein in step c) the moisture content is 12 to 50 gram or 20 to 50 gram of per 100 gram composition [thus a composition of 100 gram contains 12-50 gram water or 20 to 50 gram water and the rest is (pseudo-)cereal, typically malted or sprouted (pseudo-)cereal].

14. The method according to any one of statements 1 to 13, wherein the composition in step c) has a pH between 3.5 and 7.0.

15. The method according to statement 14, wherein said pH is obtained by a food grade acid.

16. The method according to statement 15, wherein said food grade acid is citric acid or lactic acid.

17. The method according to any one of statements 1 to 16, wherein the temperature in step c) is between 10 up to 70, 80 or 90° C.

18. The method according to any one of statements 1 to 17, wherein the temperature in step c) is between 60 and 80° C., or between 40 and 65° C.

19. The method according to any one of statements 1 to 18, wherein the time period in step c) is between 10 and 180 minutes, or between 3 and 180 minutes.

20. The method according to any one of statements 1 to 19, wherein step b) is performed for a time period of between 30 and 90 minutes, or 10 and 90 minutes.

21. The method according to any one of statements 1 to 20 wherein steps c) and d) are performed using a gradual temperature increase to a temperature exceeding 70, 80 or 90° C., whereby during the increase the composition is at a sufficiently long period to allow the enzymatic release of maltose and maltotriose from starch.

22. The method according to statement 21, wherein the gradual temperature increase is obtained prior to or as part of a pressure cooking process, or extrusion cooking process.

23. The method according to statement 21, wherein the gradual temperature increase is obtained prior to or as part of a pressure cooking process.

24. The method according to any one of statements 1 to 21, wherein the weight ratio between malted or sprouted (pseudo-)cereal and (pseudo-)cereal dry matter varies between 3/1 and 1/3.

25. The method according to any one of statements 1 to 24, wherein the weight ratio between malted or sprouted (pseudo-)cereal and (pseudo-)cereal dry matter varies between 3/1 and 1/10.

26. The method according to any one of statements 1 to 25, providing in step a) malted or sprouted (pseudo-)cereal, without further addition of a non-malted (pseudo-) cereal.

27. The method according to any one of statements 1 to 26 further adding one or more of an emulsifier, vitamin or mineral.

28. A wheat cereal flake product made of malted or sprouted wheat and one or more of grains, peeled grains, kernels, peeled kernels grits, whole meal or flour of wheat, characterised in that on a dry matter basis the sum of its soluble maltose and maltotriose content is at least 1.2% (w/w), 2% (w/w), 3% (w/w), 4% (w/w), or 5% (w/w).

29. The cereal flake product according to statement 28 wherein the weight ratio of maltose to maltotriose is between 15 and 3.

30. The cereal flake product according to statement 28 or 29, wherein on dry matter basis the sucrose content is at most, 10% (w/w), 9% (w/w) 8% (w/w) or 7.0% (w/w).

31. The cereal flake product according to statement 28 or 29, wherein on dry matter basis the sucrose content is at most 5.0%.

A cereal product wherein the amount of malted or sprouted cereal is at least 95% (w/w).

32. The cereal flake product according to any one of statements 28 to 31, which has a relative sweetness of between 3 and 20, wherein relative sweetness is defined as:

$$(glucose\ content*74+fructose\ content*110+sucrose \\ content*100+maltose\ content*50+maltotriose \\ content*30)/100.$$

33. A method of producing a whole grain cereal flake product containing on a dry matter basis at least 4.0% (w/w) maltose and 1.0% (w/w) maltotriose comprising the steps of:
    a) providing a sprouted or malted (pseudo-)cereal of a non-peeled cereal,
    b) optionally adding sugar,
    c) incubating the composition of step a) or b) in moist conditions at a temperature for a time period allowing the enzymatic release of maltose and maltotriose from starch,
    d) further heating the incubated composition,
    e) flaking the heated composition, and
    f) drying the flaked composition.

34. The method according to statement 33, wherein a non-peeled sprouted (pseudo-) cereal is provided.

35. The method according to statement 33, wherein in step c) the incubation is performed under conditions allowing a reduction in moisture content.

36. The method according to statement 35, wherein the moisture content is reduced to 25 g composition or less.

37. The method according to statement 33, wherein a malted (pseudo-)cereal is provided which is subsequently moistened.

38. The method according to statement 33 or 37, wherein the malted (pseudo-)cereal kernels in step a) are milled kernel fragments such as grits.

39. The method according to any one of statements 33 to 38, wherein the non-peeled cereal is barley and/or wheat.

40. The method according to any one of statements 33 to 39, wherein in step b) glucose and/or, fructose and/or sucrose is added in an amount of up to 6 g/per 100 g dry matter.

41. The method according to any one of statements 33 to 40, wherein in step a, c), or d the moisture content is between 20 to 50 gram of water per 100 gram composition.

42. The method according to any one of statements 33 to 41, wherein the composition in step c), d), e) or f) has a pH between 3.5 and 7.0.

43. The method according to any one of statements 33 to 42, wherein the temperature in step c) is between 10 and 130° C.

44. The method according to any one of statements 33 to 43, wherein the temperature in step c) is between 50 and 80° C.

45. The method according to any one of statements 33 to 44, wherein the time period in step c) is between 10 and 180 minutes.

46. The method according to any one of statements 33 to 45, wherein the time period in step c) is between 20 and 60 minutes.

47. The method according to any one of statements 33 to 46, wherein steps c) and/or d) are performed using a gradual temperature increase to a temperature exceeding 90° C., whereby during the increase the composition is at a sufficiently long period to allow the enzymatic release of maltose and maltotriose from starch.

48. The method according to the statement 47, wherein the gradual temperature increase is obtained as part of a pressure cooking process.

49. A (pseudo-)cereal flake product made of a sprouted or malted non-peeled (pseudo-)cereal, characterized in that on a dry matter basis the sum of its soluble maltose and maltotriose contents is at least 5.0%.

50. The flake product according to statement 49, wherein the cereal is wheat.

51. The cereal flake product according to statement 49 or 50, wherein on dry matter basis the sucrose content is at most 5.0%.

52. The cereal flake product according to any one of statements 49 to 51, which has a relative sweetness of between 3, 5, or 8 to 15 or 20, wherein relative sweetness is defined as:

(glucose content (g/100 g DS (dry solid)*74+fructose content (g/100 g DS)*110+sucrose content (g/100 g DS)*100+maltose content (g/100 g DS)*50+maltotriose content (g/100 g DS)*30)/100.

DETAILED DESCRIPTION

Figure Legends

FIG. 1 Scheme of raw materials used in cereal flake production processes.

Figure 2:
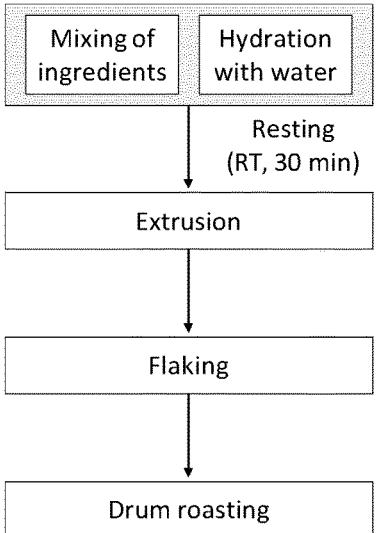

FIG. 2 Scheme of the standard cereal flake production in which hydration was with water and resting was at room temperature (RT) for 30 min.

Figure 3:
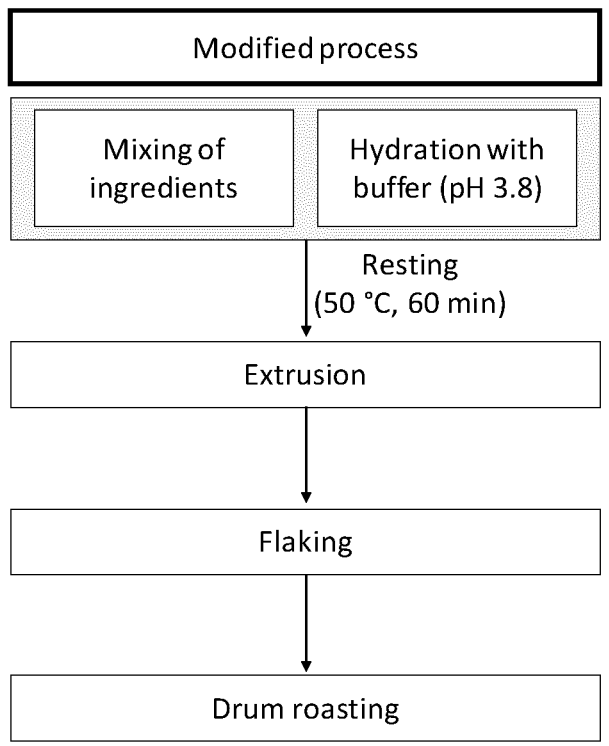

FIG. 3 Scheme of the modified cereal flake production in which hydration was with buffer and resting was at 50° C. for 60 min (referred to as modified process).

Figure 4:
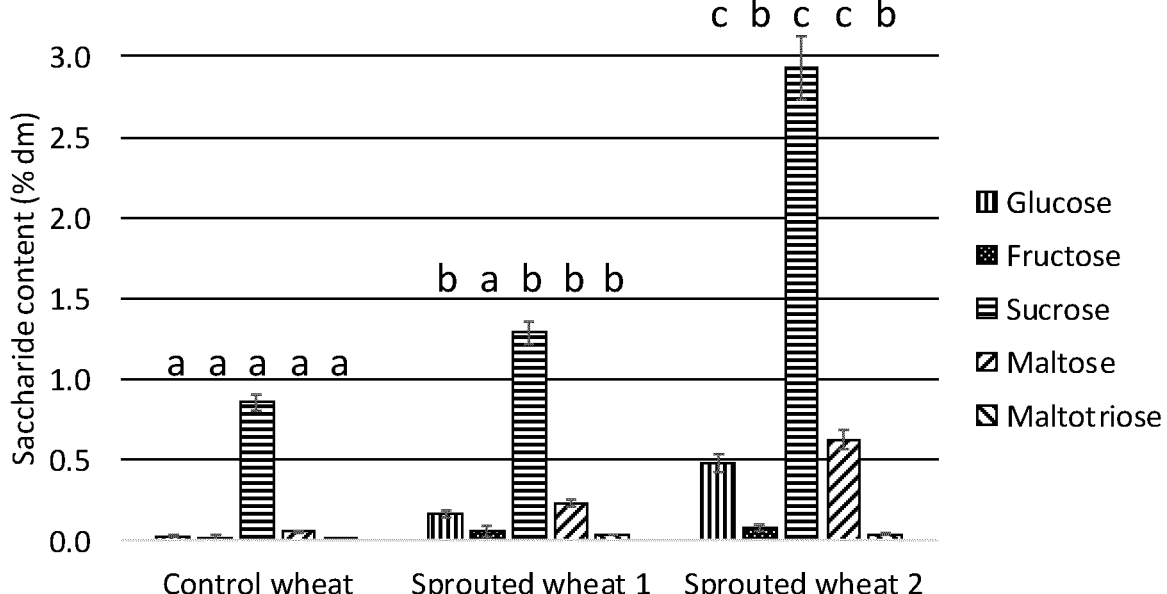

FIG. 4 Saccharide contents [% h of dry matter (dm)] in whole meal derived from the raw materials specified in FIG. 1. Mean values for saccharide contents differ significantly (p<0.05) when not sharing the same letter.

Figure 5:
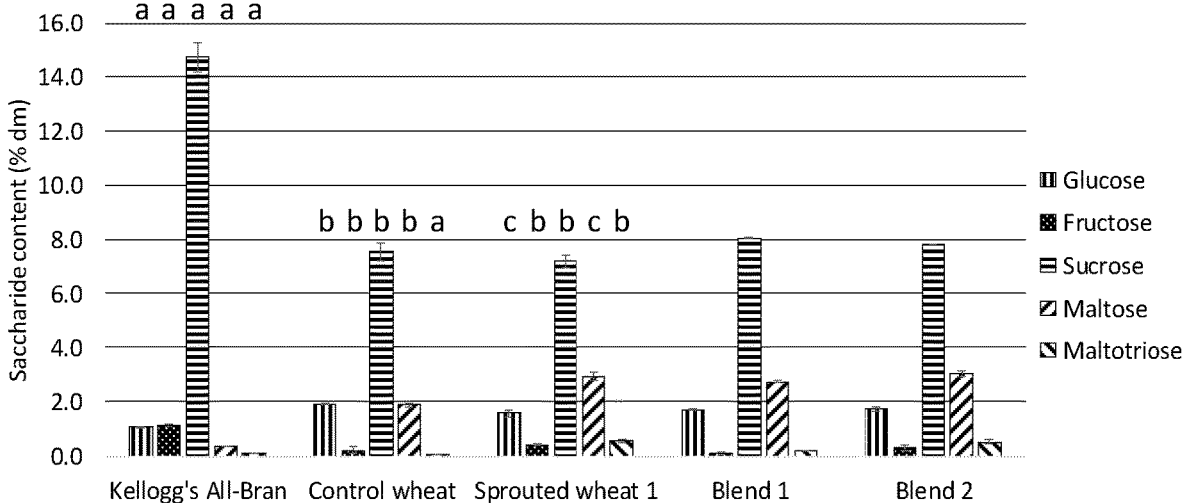

FIG. 5 Saccharide contents [% h of dry matter (dm)] in cereal flakes produced from the raw materials specified in FIG. 1 using the standard process specified in FIG. 2. Mean values for saccharide contents differ significantly (p<0.05) when not sharing the same letter.

Figure 6:
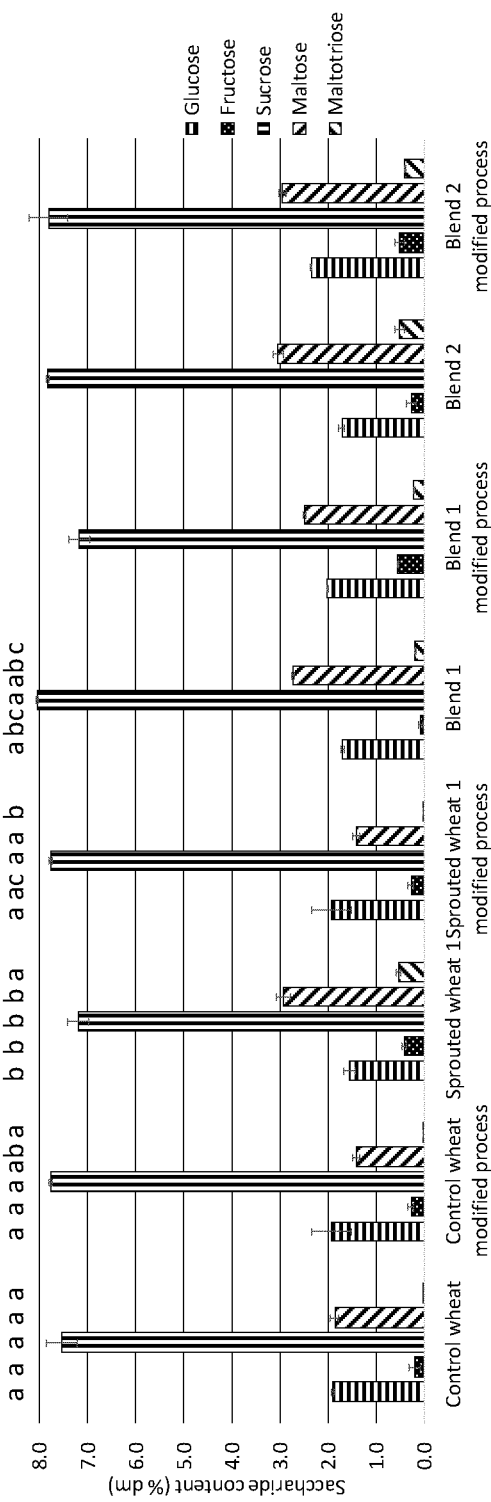

FIG. 6 Saccharide contents [% h of dry matter (dm)] in cereal flakes produced from the raw materials specified in FIG. 1 either using the standard process specified in FIG. 2 or the modified process specified in FIG. 3. Mean values for saccharide contents differ significantly (p<0.05) when not sharing the same letter.

Figure 7:
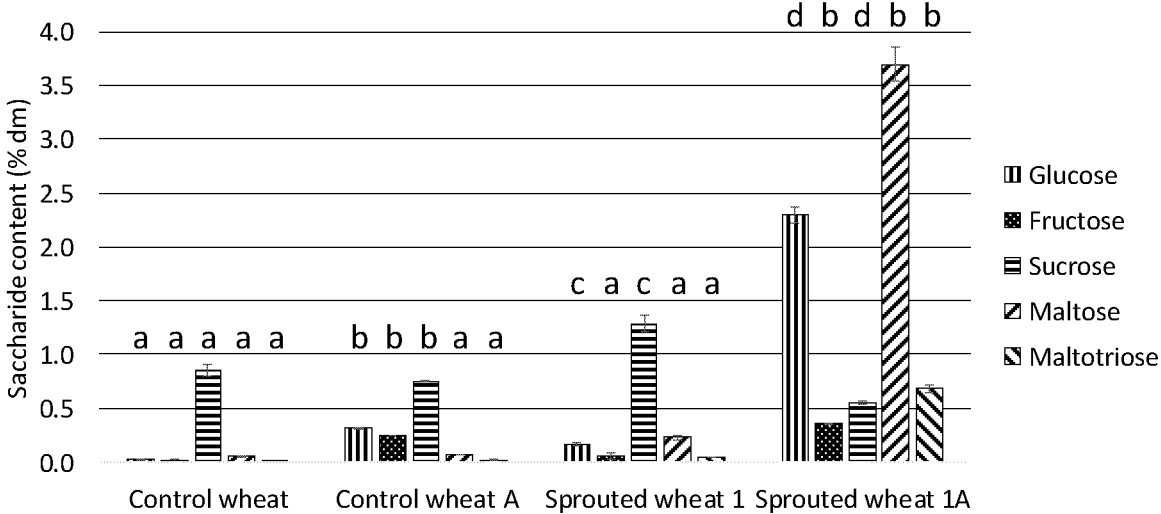

FIG. 7 Saccharide contents [% h of dry matter (dm)] of whole meal derived from the raw materials specified in FIG. 1. Mean values for saccharide contents differ significantly (p<0.05) when not sharing the same letter.

Figure 8:
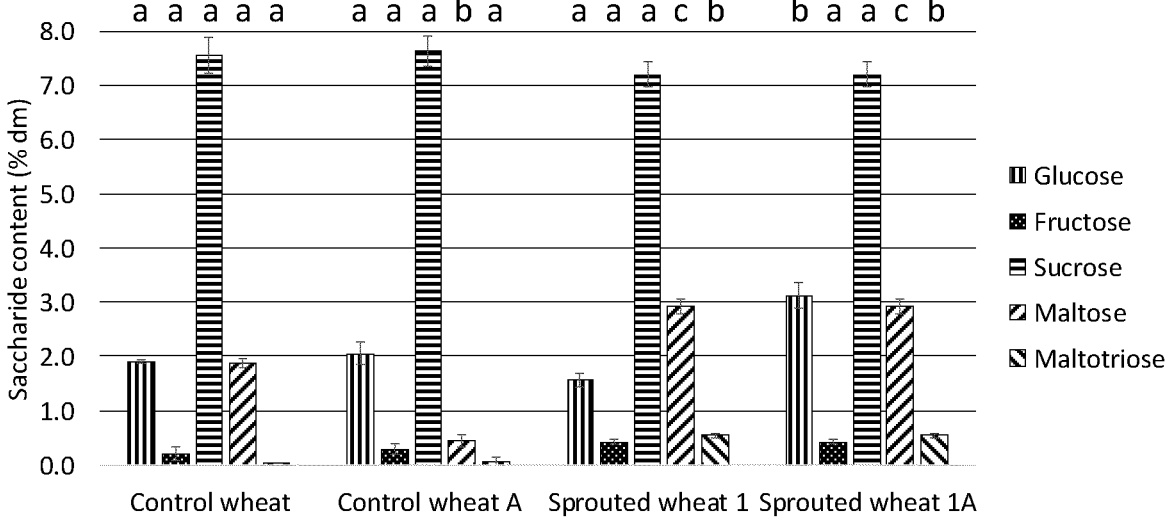

FIG. 8 Saccharide contents [% h of dry matter (dm)] in cereal flakes produced from the raw materials specified in FIG. 1 using the standard process specified in FIG. 2. Mean values for saccharide contents differ significantly (p<0.05) when not sharing the same letter.

Figure 9:
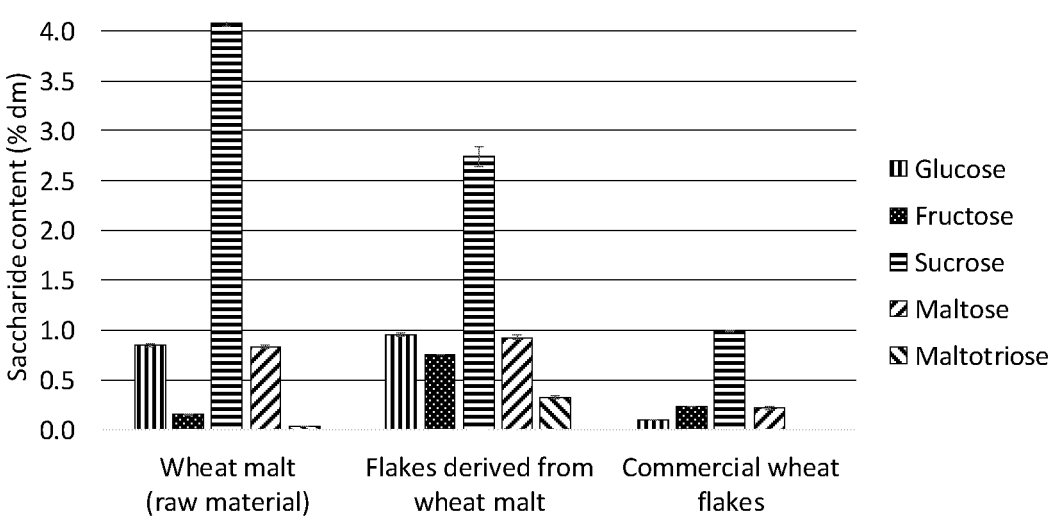

FIG. 9 Saccharide contents [% h of dry matter (dm)] in wheat malt and industrially produced cereal flakes.

Figure 10:
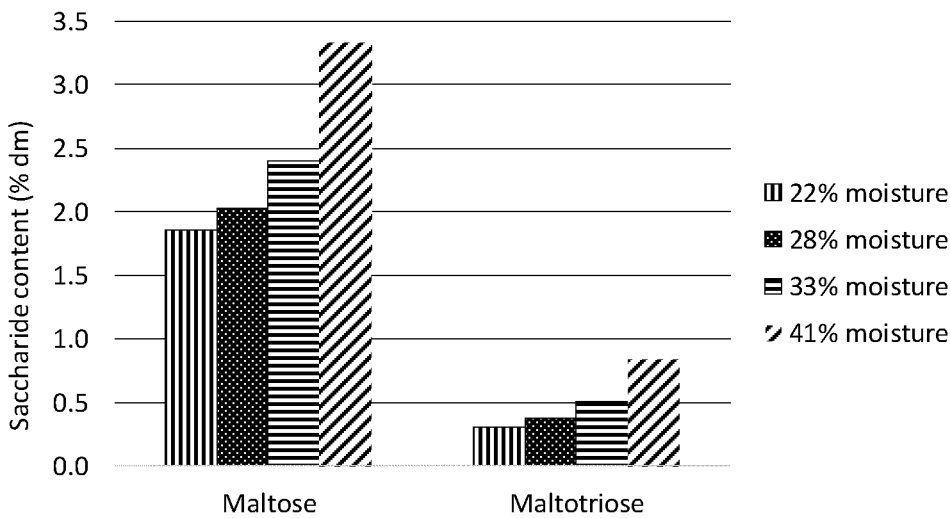

FIG. 10 Maltose and maltotriose contents [% h of dry matter (dm)] in wheat malt incubated for 60 min at 70° C. at different moisture contents.

Figure 11:
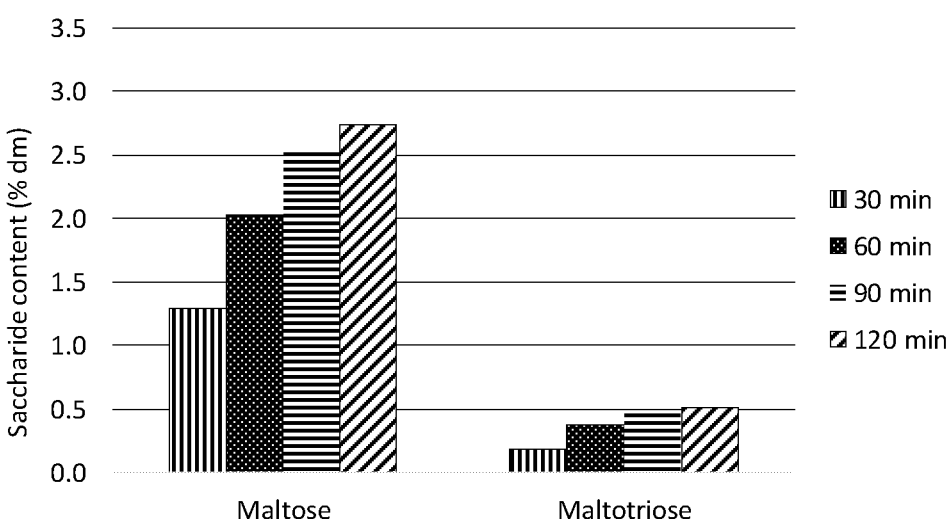

FIG. 11 Maltose and maltotriose contents [% h of dry matter (dm)] in wheat malt incubated at a moisture content of 28% and 70° C. for different incubation times.

Figure 12:
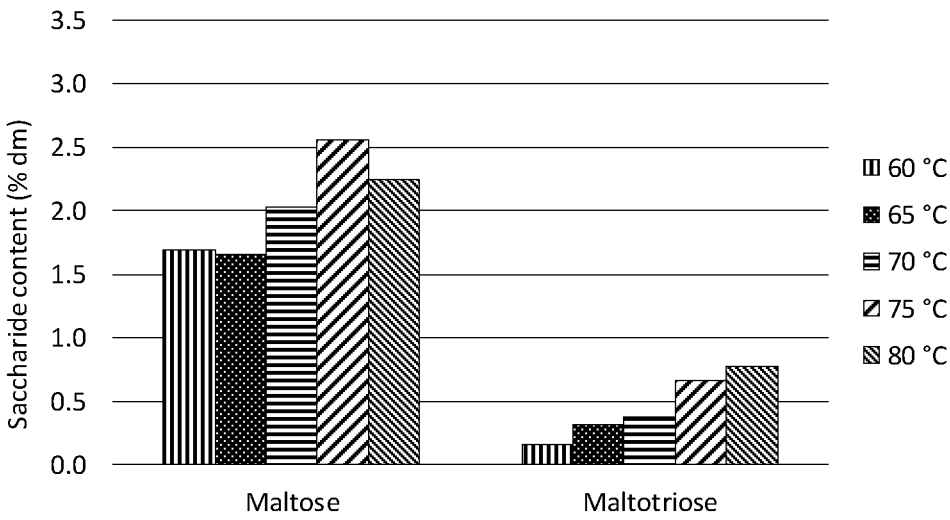

FIG. 12 Maltose and maltotriose contents [% h of dry matter (dm)] in wheat malt incubated at a moisture content of 28% for 60 min at different incubation temperatures.

Figure 13:
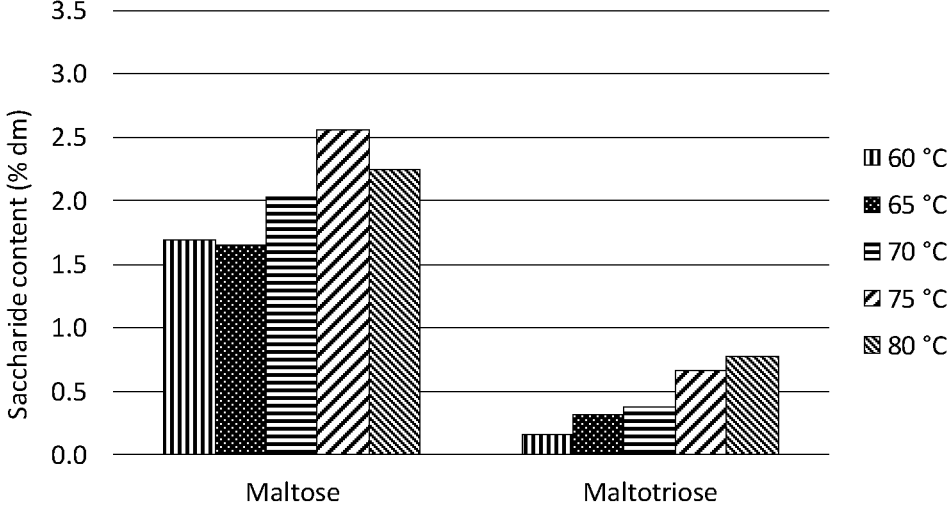

FIG. 13 Saccharide contents [% h of dry matter (dm)] in wheat malts that can be used in cereal flake production.

Cereals refers to the edible grains of cultivated grasses (Poaceae or Gramineae). Examples hereof are wheat, barley, rye, sorghum, maize and rice.

In the context of the present invention typical grains for the production of flaked products are wheat and barley.

Pseudocereals refers to edible grains of the family of the Amaranthaceae, the family of the Polygonaceae, or the family of the Chenopodiaceae. Examples hereof are amaranth, buckwheat, and quinoa, respectively.

In the context of the present invention (a) (pseudo-)cereal(s) refers to "a cereal or a pseudocereal".

The terms peeling or pearling refer to a treatment in which the outer layers of the (pseudo)cereal(s), usually 4-8% of the total grain mass, are removed.

The complete process of malting is industrially used to produce diastatic malts and consists of the subsequent steps of steeping the (pseudo-)cereal grains, their sprouting and kilning.

In the context of the present invention, depending on the process used, kilning is not always necessary.

The term malted (pseudo-)cereal is here used to any (pseudo-)cereal which has been steeped, sprouted and dried at temperatures preserving most of the enzymatic activity of the sprouted (pseudo-) cereal, and allowing a substantial enzymatic release of maltose and maltotriose from starch.

Drying allows storage for longer times and allows to uncouple the step of sprouting a cereal and the process of producing the cereal flake, whereby water has to be added to the malted cereal.

The term sprouted (pseudo-)cereal is here used to any (pseudo-)cereal which has been steeped and sprouted but not subsequently dried. Not drying the sprouted (pseudo-)cereal equally preserves most of the enzymatic activity of the sprouted (pseudo-) cereal, and allows a substantial enzymatic release of maltose and maltotriose from starch. At certain instances in the present application, sprouted cereal is also referred to as non-dried malt.

A sprouted material without drying to a malted material allows to proceed immediately to the production of the cereal flakes. This results in a significant saving in energy for drying, and a saving in water for subsequent moistening, compared to the use of malted cereals.

The omitted drying step typically also results in the generation of acrylamide, a reduction in enzymatic activity and increased colouring.

In addition to the above, such malted (pseudo)cereal on a gram dry matter base contains a minimum alpha-amylase activity of 100 or 200 U/g dry matter/hour. The material can be used in the methods of the present invention with or without further grinding or milling.

"(Pseudo-)cereal" as such, without the prefix sprouted or malted, refers to the starting material prior to steeping, or has not undergone a steeping and sprouting step.

"Cereal flake product" refers to the heated flaked and dried material obtained by the claimed method regardless a cereal, a malted cereal or a sprouted material (or mixture of two or three of these) has been used as starting material.

Sugars added in the production of (pseudo-)cereal flakes can be sucrose or mixtures of glucose, fructose and/or sucrose.

Food grade acids are citric, acetic, fumaric, lactic, phosphoric, malic or tartaric acid.

Two technologies are mostly used in the production of cereal flakes.

A first one is pressure cooking, in which grains or grain particles are steamed for about 1-2 h at elevated temperatures and pressure. The steamed mass is generally broken into small segments and dried under controlled conditions. The grit pieces are then either tempered for about 24 h or directly flaked between steel rolls. The resulting flakes are then dried and toasted under high temperature to give a suitable flavour and colour [Fast and Caldwell, 1990 cited above; Tribelhorn (1995) Breakfast Cereals, Handbook of Cereal Science and Technology, in: Lorenz & Kulp (Eds.) Dekker, M., New York, USA, 762 p.].

A second one is extrusion cooking. This is a versatile low-cost very efficient food processing technology [Oliveira et al. (2015) Int. J. Food Sci. Technol. 50, 1504-1514]. Extruders consist of a pre-conditioning system, a feeding system, a screw, a barrel and a die with a cutter [Navale et al. (2015) J. Ready to Eat Food 2, 66-80). For cereal flake production, the extruded pellets can be flaked between steel rollers and the resulting flakes are typically toasted to obtain a specific crisp texture, flavour and colour [Ding et al. (2006) J. of Food Eng. 73, 142-148; Le Corre (2006) Cereal Foods World 51, 302-305].

Wheat, spelt, rice and barley grains are generally peeled (i.e. pearled, polished); In such treatment, 4-8% of the outer layers are removed prior to cereal flake making to ensure good organoleptic quality [Fast and Caldwell, 1990, cited above]. Unfortunately, the resulting flakes do not meet the requirements for whole grain products. The definition reads as follows: "Whole grains shall consist of the intact, ground, cracked or flaked kernel after the removal of inedible parts such as the hull and husk. The principal anatomical components—the starchy endosperm, germ and bran—are present in the same relative proportions as they exist in the intact kernel. Small losses of components—that is, less than 2% of the grain/10% of the bran—that occur through processing methods consistent with safety and quality are allowed" [van der Kamp et al. (2014) Food & Nutrition Res. 58, 1-8].

It is an aspect of the present invention that the methods described herein do not require peeling of grains prior to pressure cooking in order to obtain a good organoleptic quality in the resulting flakes. Whole grain-based products deserve to be an important part of a healthy diet as consumption thereof may reduce the risk of developing diet-related disorders such as obesity (Anderson et al. (1994) Am. J. Clin. Nutr. 59, 1242-1247), diabetes type II (de Munter et al. (2007) PLOS Med. 4, 1385-1395), cardiovascular disease (Liu et al. (1999) Am. J. Clin. Nutr. 70, 412-149) and cancer (Slavin et al. (2000) J. Am. Coll. Nutrition 19, 300-307). Their health benefits are mainly ascribed to the presence of high concentrations of dietary fibre and bio-active compounds such as B-vitamins, minerals, polyphenols and methyl donors (Shewry and Hey (2015) Food and Energy Security 4, 178-202).

The sweetness of cereal flakes can be enhanced by using sprouted grains as a source of intrinsic saccharides which are released by starch degrading enzymes. Indeed, the relative sweetness was increased to 7 to 9 fold in malted wheat (see FIG. 13 and 5.5-fold in sprouted and hydrothermally processed whole meal (sprouted wheat 1A) compared to control whole meal. This raw material can thus be used to reduce the level of sugar addition in breakfast flakes.

To conclude, the use of these novel ingredients with high levels of hydrolysing enzymes in a rationally modified production process, such as the use of a malted cereal, led to cereal flakes with intrinsic sugar contents which deliver sweet notes to the product and serve as flavour precursors in the Maillard reactions (caramel and toast aromas). Moreover, by fully exploiting the nutritional profile of wheat grains, cereal flakes with a cleaner label (no added sugars) can be obtained which will contribute to the consumers' needs.

EXAMPLES

Example 1

1.1. Materials

Winter wheat [Cellule winter wheat, moisture content of 12.6%, protein content of 9.7% of dry matter (dm)] was kindly supplied by Limagrain (Avelgem, Belgium). Salt, sucrose and glucose were food grade. Kellogg's All-Bran flakes were from a local supermarket. They are made from 66% whole wheat meal, 21% wheat bran and 6% oat meal and fortified with vitamins and Fe and were for comparison reasons.

1.2. Methods 1.2.1. Steeping, Sprouting and Hydrothermal Processing of Wheat

To study their functionality in cereal flake making, control wheat grains were processed using three regimes shown in FIG. 1 i.e.

(i) a standard sprouting condition (steeping at 15° C. for 29 h and sprouting at 15° C. for 48 h) resulting in sprouted wheat 1, (ii) a process in which control wheat and sprouted wheat 1 were hydrothermally processed at conditions (50° C., pH 3.8 for 8 h) optimal for phytate hydrolysis and then autoclave (Systec VX-55, Systec, Linden, Germany) cooked (121° C., 10 min), resulting in control wheat A and sprouted wheat 1A, respectively, and (iii) a sprouting condition optimal for both phytate and AX hydrolysis (steeping at 15° C. for 36 h and sprouting at 26° C. for 48 h) resulting in sprouted wheat 2. The processed wheat grains were flash-frozen using liquid nitrogen ($N_2$) and freeze-dried (to a moisture content of 5%). These four types of processed wheat grains and control wheat were then milled (FOSS Tecator cyclotec 1093 sample mill, HillerØd, Denmark) into whole meal (<500 µm) prior to cereal flake production. In addition, we also prepared whole meal blends in which we used 75% control wheat and either 25% sprouted wheat 1 (blend 1) or 25% sprouted wheat 2 (blend 2) (FIG. 1).

1.2.2. Production of Cereal Flakes 1.2.2.1. Standard Cereal Flake Production

Cereal flakes were made on pilot scale essentially as in Joye et al. (2011) Food Chem. 129, 395-401; De Brier et al. (2015) LWT-Food Sci. Technol. 62, 668-674; De Brier et al. (2015) J. Cereal Sci. 62, 66-72] from a recipe consisting of 358 g dm wheat whole meal, 30 g sucrose, 10.0 g glucose and 2.0 g salt. The sucrose, glucose and salt were dissolved in the amount of water (160 ml) needed to obtain a moisture content of 30% in the ingredient bill (FIG. 2). Then all ingredients were blended for 2 min in a Stephan UMS 5 electronic mixer (Hameln, Germany), mixed by hand and then mixed again for 30 s to ensure proper homogenisation.

After a 30 min rest at room temperature (RT), the mixture was extruded with a Brabender (Duisburg, Germany) single screw extruder (65-100° C., 1-4 bar, screw speed 100 rpm, nozzle diameter 6 mm) to form pellets with a moisture level of 25 to 28% (Sartorius Moisture Analyser MA30, Gottingen, Germany). These were then flaked at RT with a roller mill (Shule, Hamburg, Germany) with a gap setting of 0.25 mm and air-dried overnight. When needed, the resultant flakes were conditioned in a climate chamber (HC0057, Heraeus Votsch, Hanau, Germany) at 30° C. and 80% relative humidity for 4 h to a moisture content of 12-15%. Finally, they were toasted in a drum roaster (PROBAT-WERKE von Gimborn Maschinenfabrik, Emmerich am Rhein, Germany) for 3 min at 248° C. resulting in a moisture level of 3-5%.

Samples were withdrawn immediately after mixing, before the start of extrusion (i.e. after resting), after extrusion, after flaking and after roasting. All samples but the roasted flakes were stored at −20° C. After freeze-drying, these samples and part of the roasted flakes were ground with an IKA-mill (Staufen, Germany).

1.2.2.2. Modified Cereal Flake Production

In the modified process, 160 ml 100 mM sodium acetate buffer (pH 3.8) was added to the ingredients instead of water (160 ml) and the ingredient mixture was rested at 50° C. for 60 min instead of at RT for 30 min (FIG. 3). Samples were withdrawn, stored, freeze-dried and ground as above.

1.2.3. Analysis of the Flakes

High Performance Anion Exchange Chromatography (HPAEC) with Pulsed Amperometric Detection (PAD) was performed with a Dionex ICS5000 system (Dionex, Sunnyvale, CA, USA) to quantify in triplicate the soluble saccharides formed during sprouting, hydrothermal processing and (modified) cereal flake production. Aqueous extracts were obtained by adding 10.0 ml deionised water to 80-100 mg sample, extraction (30 min, 150 rpm, 7° C.) and centrifugation (10 min, 1,500 g, 7° C.). An aliquot (50 µl) of supernatant was then added to 950 µl deionised water and after filtration (0.22 µm), an aliquot (12.5 µL) was injected on Carbopac PA-100 guard and PA-100 anion exchange (250×4 mm) columns. The mobile phase (1.0 ml/min) during equilibration and the first 5 min of the run was 100 mM NaOH. The sodium acetate concentration in 100 mM NaOH was then increased at 3.6 mM/min over 25 min. Glucose, fructose, sucrose, maltose, maltotriose and rhamnose (internal standard added to the sample before extraction and of which 0.125 µg in 12.5 µL was eventually injected) were used to identify and quantify the saccharides (% w/w of dm). The total soluble saccharide contents (% of dm) in the different samples were here calculated as the sum of the measured glucose, fructose, sucrose, maltose and maltotriose contents. With the obtained soluble saccharide contents (g/100 g) of the samples (raw materials or cereal flakes), their relative sweetness values were calculated using the following equation [Lavic (2011) Relative sweetness values for various sweeteners. XP055434432]:

$$\text{Relative sweetness} = \frac{\begin{array}{c}(\text{glucose content}) * 74 + \\ (\text{fructose content}) * 110 + (\text{sucrose content}) * 100 + \\ (\text{maltose content}) * 50 + (\text{maltotriose content}) * 30\end{array}}{100}$$

With 74, 110, 50 and 30 the relative sweetness factors of glucose, fructose, maltose and maltotriose, respectively, compared to sucrose which has a relative sweetness value of 100.

Alpha-amylase activity in raw materials (FIG. 1) and/or flakes was determined in triplicate with the Amylazyme method (Megazyme, Bray, Ireland) as described in De Brier et al. (2015) *LWT-Food Sci. Technol.* 62, 668-674 and De Brier et al. (2015) *J. Cereal Sci.* 62, 66-72, with slight modifications. A substrate tablet was added to 1.0 ml of a 5-50 times diluted pre-incubated extract at 40° C. and the reaction was stopped after 5 to 120 min of incubation. Extract dilution and incubation time depended on the sprouting time and were chosen such that the Lambert-Beer law was applicable. One α-amylase unit is defined as the enzyme activity per gram dry matter in which the extinction (590 nm) increases by 1.00 per h of incubation at 40° C.

1.3. Results and Discussion 1.3.1. Cereal Flakes from Control and Sprouted Wheat Grains or Blends Thereof 1.3.1.1. Soluble Saccharide Contents in the Cereal Flakes FIG. 4 represents the saccharide composition of whole meal derived from control wheat, sprouted wheat 1 and sprouted wheat 2. Sprouting resulted in a significant increase in glucose, maltose and maltotriose contents as a result of starch hydrolysis. In addition, there was a significant increase in sucrose levels, which is the most important energy source during early sprouting [Aoki et al. (2006) *Plant Physiol.* 141, 1255-1263; Benincasa et al. (2019) *Nutrients* 11, 1-29]. Further, sprouting at 26° C. (sprouted wheat 2) instead of at 15° C. (sprouted wheat 1) led to a substantially higher saccharide content, which can give an intrinsic sweet note to cereal flakes.

FIG. 5 represent the saccharide contents of the cereal flakes produced with the standard process specified in FIG. 2 from an ingredient bill which included 7.5% sucrose and 2.5% glucose. The sucrose content of the commercial flakes amounted to about 15% of dm, in line with the amount mentioned on the label. The use of sprouted wheat 1, blend 1 and blend 2 led to increased levels of maltose and maltotriose obviously as a result of α-amylase action. Kruma et al. (2018) *Agronomy Res.* 16, 1405-1416 noted a saccharide (mainly sucrose and maltose) content of 1.5% of dm when using 40% sprouted cereals (triticale, oat and barley), but 2.2% of dm when using 50% of sprouted cereals (rye, oats and barley) in cereal flakes produced neither by extrusion, roasting, nor by adding sugars. They attributed the increase in saccharide content to enzymatic hydrolysis of starch.

1.3.2. Modified Cereal Flake Production

In this section, we discuss the characteristics of cereal flakes produced from the raw materials of FIG. 1 using the modified production protocol of FIG. 3. Where relevant, comparison is made with the outcome of processing using the standard process specified in FIG. 2.

1.3.2.1. Soluble Saccharide Contents in the Cereal Flakes

As stated earlier, the levels of maltotriose were higher in flakes derived from (blends containing) sprouted wheat than in those of control wheat (FIG. 6).

1.3.3. Impact of the Use of Hydrothermally Processed (Sprouted) Wheat Grains on Cereal Flake Properties In this section, we investigated the properties of cereal flakes prepared from hydrothermally processed (sprouted) wheat grains by using the standard process specified in FIG. 2. Where relevant, comparison is made with the outcome of processing using other raw materials specified in FIG. 1.

1.3.3.1. Soluble Saccharide Contents in the Cereal Flakes

The sweet taste of cereal flakes can be enhanced by using sprouted grains as a source of intrinsic saccharides released by starch degrading enzymes. FIG. 7 represents the saccharide composition of whole meal derived from control (A)

and sprouted wheat 1 (A). Hydrothermal processing of control wheat significantly decreased the sucrose content, while the glucose and fructose content increased, indicating invertase action [Kashem et al. (1995) *J. Ntl. Sci. Found. Sri Lanka* 23, 55-61]. The processing conditions here used may have favoured wheat invertase action since the enzyme is optimally active in a pH range from 4.5 to 5.5 [Krishnan et al. (1985) *Plant Physiol.* 78, 241-245]. In addition, both neutral and acid invertases in wheat have optimal activity temperatures ranging from 35 to 50°. As stated earlier, a significant increase in glucose and sucrose levels occurred during sprouting of wheat (cfr. section 1.3.1.1). When the sprouted grains were then hydrothermally processed (sprouting wheat 1A), 16-fold and 18-fold increases in maltose and maltotriose levels were obtained, respectively, as a result of $\alpha$-amylase action under conditions more close to its optimum (pH 5.0, 68° C.) [Singh & Kayastha (2014) *Food Chem.* 162, 1-9]. In line with what was observed for control wheat A, a decrease in sucrose levels and increases in fructose and glucose levels were found as a result of invertase action in sprouted wheat 1A. The 14-fold increase in glucose levels was a result of the action of other enzymes such as $\alpha$-glucose [Kruger & Reed (1988) Enzymes and color, Wheat: Chemistry and Technology. American Association of Cereal Chemists, St. Paul, MN, USA, p. 441-500].

The use of sprouted wheat 1A in a cereal flake recipe is of interest since the relative sweetness value of this raw material was calculated to be 4.4 whereas that of control whole meal was assessed to be 0.8. This intrinsic sweetness allows manufacturers to reduce levels of added sugars in cereal flakes [Pagand et al. (2017) *Cereal Foods World* 62, 221-226]. For example, a breakfast flake recipe containing 90 g control whole meal and 10 g sucrose has a relative sweetness value of 10.7. To obtain the same relative sweetness value in breakfast flakes derived from sprouted wheat 1A, the recipe would consist of 93.4 g whole meal derived from sprouted wheat 1A and only 6.6 g sucrose. Thus, the addition of sucrose can be reduced by 34%.

In a next step, the composition of saccharides in cereal flakes made from hydrothermally processed (sprouted) wheat was evaluated (FIG. 8). When including 7.5% sucrose and 2.5% glucose in the recipe, no clear differences in saccharide composition and saccharide content were observed between control wheat and control wheat A. The significantly lower maltose content after hydrothermal processing was unexpected. Hydrothermal processing of sprouted wheat 1 (sprouted wheat 1A) did significantly increase glucose levels as a result of $\alpha$-glucosidase action.

2. Example 2

2.1. Methods

2.1.1. Production of Wheat Flakes Derived from Malted Grains

Whole wheat flakes were made on industrial scale. The wheat malt had the following specifications: moisture content 5.6%, protein content 11.2% of dm, EBC color 3.5 and $\alpha$-amylase activity of about 6,900 U/h/g dm. Malted whole wheat grains were first cleaned to remove foreign material. All ingredients were added to a pressure cooker. The cooked mass was then dried/tempered prior to lump breaking. Next, the broken cooked mass was flaked between rolls and the flakes were hot-air toasted. Finally, the resulting flakes were ground with an IKA-mill prior to quantifying the soluble saccharide contents (cfr. 1.2.3).

Alpha-amylase activity in malted wheat grains (FIG. 13) was determined in triplicate with the Amylazyme method (Megazyme, Bray, Ireland) as described in De Brier et al. (2015) *LWT-Food Sci. Techn.* 62, 668-674. with slight modifications. A substrate tablet was added to 1.0 ml of a 5-50 times diluted pre-incubated extract at 40° C. and the reaction was stopped after 5 to 120 min of incubation. Extract dilution and incubation time depended on the sprouting time and were chosen such that the Lambert-Beer law was applicable. One $\alpha$-amylase unit is defined as the enzyme activity per gram dry matter in which the extinction (590 nm) increases by 1.00 per h of incubation at 40° C.

2.1.2. Incubation of Malted Wheat Grains

Incubation of malted wheat grains (50.0 g) was in closed Schott glass bottles at a moisture content of 22-41% and a temperature of 40-80° C. for a time period of 10-120 min. After incubation, the grains were flash-frozen with liquid $N_2$, freeze-dried and milled (IKA-mill) into whole meal prior to quantifying the maltose and maltotriose contents (cfr. 1.2.3).

2.2. Results and Discussion

2.2.1. Soluble Saccharide Contents in the Cereal Flakes

FIG. 9 represents the saccharide composition of industrially produced cereal flakes. When wheat malt was used with high $\alpha$-amylase activity levels in a cereal flake production process, a soluble saccharide content of 5.7% of dm was found in the resulting flakes, which is comparable to that in the raw material used (5.9% of dm). The sucrose content was lower, while the glucose and fructose contents were higher than in the raw material, indicating invertase action during cereal flake making. The increase in maltotriose content from 0.03% of dm in the raw material to 0.33% of dm in the flakes is attributed to $\alpha$-amylase action during cereal flake making. The sweet taste of whole grain flakes can thus be enhanced by using malted grains as a source of starch degrading enzymes that release intrinsic saccharides. Indeed, the soluble saccharide content in commercially available wheat flakes derived from regular wheat amounted to only 1.6% of dm.

Further, the present invention does not require peeling of grains prior to pressure cooking in order to obtain a good organoleptic quality in the resulting flakes. Indeed, malting causes structural changes in cereal cell walls [Autio et al. (2001) *J. Institute Brewing* 107, 19-25; De Backer et al. (2010) *Plant Physiol. Biochem.* 48, 90-97] and gives a natural sweet taste to the grains so that retaining the bran does not result in poor quality of the end product. As a result, our technology allows producing palatable whole grain flakes.

2.2.2. Soluble Saccharide Contents in Incubated Malted Wheat Grains

To further increase the soluble saccharide contents in malted grains, an incubation step under moist conditions at elevated temperatures was executed of which the results are discussed in this section. As a note, the incubation step can also be part of the cereal flake production process.

2.2.2.1. Impact of Moisture Content on Maltose and Maltotriose Contents

Maltose and maltotriose contents were increased when increasing the moisture content of wheat malt incubated at 70° C. for 60 min (FIG. 10). This is logical since amylases are more active in moist conditions. For instance, Roder et al. (2009) *Food Chem.* 113, 471-478, found that $\alpha$-amylase action on wheat starch is relatively low until the water content reaches 30%, whereupon it rises sharply.

2.2.2.2. Impact of Incubation Time on Maltose and Maltotriose Contents

Maltose and maltotriose contents were increased when increasing the incubation time of wheat malt at 70° C. and a moisture content of 28% (FIG. 11). This was expected as amylases were allowed to be active at a temperature close to their optimum (55-68° C.) [Daba et al. (2012) *Enz. Microbial Technol.* 51, 245-251; Singh & Kayastha (2014) *Food Chem.* 162, 1-9].

2.2.2.3. Impact of Incubation Temperature on Maltose and Maltotriose Contents

In general, maltose and maltotriose contents were increased when increasing the temperature during incubation of wheat malt at a moisture content of 28% for 60 min (FIG. 12). However, the highest maltose content (2.6% of dm) was found in wheat malt incubated at 75° C., while the highest maltotriose content (0.8% of dm) was found in wheat malt incubated at 80° C.

In conclusion, when one is to maximise the soluble saccharide content and, hence, the intrinsic relative sweetness, in flakes derived from diastatic malted wheat, it is of interest to implement an incubation step under moist conditions (>28%) at temperatures ranging from 60 to 80° C. for a time period exceeding 60 min, allowing the enzymatic release of maltose and maltotriose from starch.

3. Example 3

3.1. Methods 3.1.1. Wheat Malt

The wheat malt used has the following specifications: moisture content 6-12%, protein content 10-12% of dm, EBC (European Brewery Convention unit) colour <10, α-amylase activity of 20-400 U/h/g dm and total soluble saccharide content of 9-13% of dm.

3.1.2. Production of Wheat Flakes Derived from Malted Grains

Whole wheat flakes are made on industrial scale (cfr. 2.1.1). Malted whole wheat grains are first cleaned to remove foreign material. All ingredients are added to a pressure cooker. The cooked mass is then dried/tempered prior to lump breaking. Next, the broken cooked mass are flaked between rolls and the flakes are hot-air toasted. Finally, the resulting flakes are ground with an IKA-mill prior to quantifying the soluble saccharide contents (cfr. 1.1.3).

3.1.3. Texture Analysis of Wheat Flakes

The texture of flakes is studied using an Instron 5943 (Norwood, MA, USA) material testing machine equipped with a 1 kN load cell as described by De Brier et al. *LWT-Food Sci. Techn.* 62, 668-674. Tests are performed in ten fold in bulk (15.0 g) with a five-blade Kramer shear cell. The blades of the cell force the breakfast flakes through the open spaces at the bottom of the cell. Samples are compressed at 120 mm/min at room temperature. The maximum force ($F_{max}$, [N]) is a measure for the hardness of the sample. The spatial frequency of ruptures ($N_{sr}$, [mm$^{-1}$]), the average crushing force ($F_{cr}$, [N]) and the crispness work ($W_c$ [N·mm]) are calculated from the force-displacement curves using the following equations (Agbisit et al. (2007) *J. Texture Studies* 38, 199-219).

$$Nsr = \frac{n}{d}$$

$$Fcr = \frac{s}{d}$$

$$Wc = \frac{Fcr}{Nsr}$$

with s, the area under the curve, n the number of peaks and d the travel distance of the probe.

A most important quality parameter of cereal flakes is how well their texture withstands being soaked in milk (De Brier et al. (2015) *LWT-Food Sci. Techn.* 62, 668-674). Approximately 15.0 g of breakfast flakes are soaked in six fold during 30 s in 300 ml semi-skimmed milk in a tea sieve at 23±1° C. under continuous stirring (200 rpm), basically as in Sachetti et al. (2003) and De Brier et al. (2015 *LWT—Food Sci. Techn.* 62, 668-674). The soaked flakes are drained for 30 s to remove excess milk from the surface and texture analysis is performed as described above.

The invention claimed is:

1. A method of producing a whole grain wheat flake product containing, on a dry matter basis, at least 4.0% (w/w) maltose and at least 1.0% (w/w) maltotriose, the method comprising:

(a) providing a sprouted non-peeled wheat;

(b) incubating the sprouted non-peeled wheat, in the absence of added sugar, in moist conditions at an incubation temperature for an incubation time period that allows the enzymatic release of maltose and maltotriose from starch in the sprouted non-peeled wheat, to obtain an incubated composition;

(c) further heating the incubated composition of (b) to obtain a heated composition;

(d) flaking the heated composition of (c) to obtain a flaked composition; and (e) drying the flaked composition of (d) to obtain a dried composition, wherein the whole grain wheat flake product comprises bran in a relative proportion that is substantially the same as the relative proportion of bran present in whole grain wheat kernels.

2. The method according to claim 1, wherein the incubated composition has a moisture content of less than or equal to 25 grams moisture per 100 grams incubated composition.

3. The method according to claim 1, wherein the sprouted non-peeled wheat is malted, the method further comprising moistening the sprouted non-peeled wheat before the incubating of (b).

4. The method according to claim 1, wherein the moisture content of the sprouted non-peeled wheat of (a), of the incubated composition of (b), or the heated composition of (c) is from 20 grams water to 50 grams water per 100 grams composition.

5. The method according to claim 1, wherein the incubated composition of (b), the heated composition of (c), the flaked composition of (d), or the dried composition of (e) has a pH from 3.5 to 7.0.

6. The method according to claim 1, wherein the temperature of (b) is from 10° C. to 130° C.

7. The method according to claim 1, wherein the temperature of (b) is from 50° C. to 80° C.

8. The method according to claim 1, wherein the time period of (b) is from 10 minutes to 180 minutes.

9. The method according to claim 1, wherein the time period of (b) is from 20 minutes to 60 minutes.

10. The method according to claim 1, wherein (b) and/or (c) comprise a gradual temperature increase to greater than 90° C., whereby enzymatic release of maltose and maltotriose from starch in the sprouted non-peeled wheat or in the incubated composition occurs during the gradual temperature increase.

11. The method according to claim 10, wherein the gradual temperature increase is obtained during a pressure cooking process.

12. The method according to claim 1, wherein the sprouted non-peeled wheat of (a) is intact.

* * * * *